Patented Dec. 29, 1942

2,306,646

UNITED STATES PATENT OFFICE 2,306,646

PREPARATION OF MONOSODIUM GLUTAMATE

Paul R. Shildneck, Decatur, Ill., assignor to A. E. Staley Manufacturing Company, Decatur, Ill., a corporation of Delaware No Drawing. Application August 10, 1940, Serial No. 352,159

6 Claims. (Cl. 260—534)

The present invention relates to an improved process for the preparation of monosodium glutamate and has as a principal object the economical production of this material from glutamic acid and recovery of the monosodium glutamate in the form of relatively large crystals which are free-flowing and dustless.

Another object of the invention is the recovery of monosodium glutamate from an aqueous solution by the controlled addition of alcohol to the solution.

Still another object of the invention is the crystallization of monosodium glutamate from an aqueous solution by partially seeding the solution with previously formed crystals and subsequently adding to the solution an alcohol which will induce the initial formation of a limited number of fine crystalline particles which subsequently are built up into particles of relatively large free-flowing crystalline form, the alcohol being added to the solution over a relatively long period of time to provide controlled supersaturation.

These and other objects will be understood upon a consideration of the following description of a preferred embodiment of the invention.

Monosodum glutamate is rather widely used as a condiment and may be produced by the neutralization of glutamic acid with sodium hydroxide. Heretofore the monosodium glutamate has been recovered by such processes as concentrating the aqueous solution under reduced pressure to a state of supersaturation which induces crystallization of the material in the form of fine, dusty particles or crystals which have a definite caking tendency. Other known processes for the recovery of the monosodium glutamate include adding a water solution of the material to alcohol. Again, there results the formation of a fine crystalline mass which is somewhat unsatisfactory. The monosodium glutamate solution has a definite tendency for losing its clear color and becoming yellowish if the temperature of the solution is raised unduly. This fact, together with the tendency of the material to crystallize in a dust-like form has presented a definite problem of recovery. In accordance with the present invention there is obtained a relatively large crystalline form of monosodium glutamate which may be packed and shipped in containers without incurring the danger of caking. Also, the improved method of production practically eliminates the problem of dusting, which has been encountered heretofore in the manufacture of solid forms of monosodum glutamate.

The monosodium glutamate is known as the monosodium salt of d-glutamic acid and crystallizes with one molecule of water which is retained even after prolonged heating at 100° C. The salt itself is laevo rotatory. The salt is produced from an aqueous suspension of d-glutamic acid and reference herein to the acid will be understood to apply to the dextro rotatory form of the acid.

In the preparation of the monosodium glutamate solution it is preferred that the glutamic acid be as pure as possible, although it is not essential that it be chemically pure. Glutamic acid generally is produced by the hydrochloric acid hydrolysis of corn or wheat glutens, and is usually separated from the liquid hydrolyzate as glutamic acid hydrochloride or as free glutamic acid. I have found that the presence of nominal proportions (5 to 10 per cent) of by-products of the hydrolysis such as tyrosine or of inorganic chlorides in the glutamic acid do not interfere with the subsequent alcohol crystallization of monosodium glutamate, as will be described, but that the presence of that much mother liquor hydrolyzate solids in the monosodium glutamate solution does exert a definite detrimental effect upon the crystallization characteristics of the salt. The rate of crystallization is retarded to such an extent by the mother liquor solids that efforts to increase it to a practical value by raising the degree of monosodium glutamate supersaturation through use of higher ratios of alcohol inevitably result in extensive "false graining" and the consequent presence of "fines" in the product. Therefore, a glutamic acid is employed which does not contain more than 10 per cent of mother liquor hydrolyzate solids. The most convenient method of determining hydrolyzate solids in the glutamic acid (which, when in the form of a wet, washed filter cake, should be free of solid tyrosine and solid inorganic salt) is to measure its specific rotation. The specific rotation of pure glutamic acid in hydrochloric acid solution, and under conditions as described later, is plus 32.0° circular. The specific rotation of the mother liquor hydrolyzate solids determined in the same manner is practically zero. Thus, the difference between 32 and the observed specific rotation of the impure glutamic acid is an indirect measure of the mother liquor solids present.

The specific rotation of glutamic acid is properly measured in 10 per cent concentration in 5° Baumé HCl using white light and a temperature of 20° C. Reference herein and in the appended claims to the specific rotation of glutamic acid will be understood to mean when measured under these conditions. In the production of sodium glutamate as referred to in the specific examples given herein a glutamic acid solution was employed having a specific rotation of 30.0°, and the glutamic acid should have a specific rotation of at least 29° circular.

To produce a satisfactory monosodium glutamate solution 300 pounds of dry crude glutamic acid were rapidly added with stirring to 615 pounds of 13 per cent (by weight) caustic soda solution. All of the glutamic acid was dissolved, and the pH of the solution as measured on a sample diluted tenfold with distilled water was found to be 6.8. The resulting solution of monosodium glutamate was of relatively dark brown color and had a density of 26.0° to 26.5° Baumé at 25° C. At this temperature the solution was virtually saturated.

After the production of the monosodium glutamate solution in the manner described the solution was stirred 15 to 30 minutes with 15 pounds of activated carbon. The treatment with activated carbon results in a reduction of the color of the solution and aids materially in the subsequent crystallization of monosodium glutamate.

The mixture of decolorizing carbon and monosodium glutamate solution then was filtered through paper in a filter press. There was obtained about 85 gallons (870 pounds) of light yellow filtrate. The filter cake was washed with 92 pounds of clear water and the wash water was added to the main filtrate, providing a total filtrate volume of 96 gallons having a density of about 24.5° Baumé at 25° C.

It is not necessary that the monosodium glutamate solution be prepared precisely in this manner.

The recovery of the desired type of monosodium glutamate from its solution is based upon the controlled addition of an alcohol to the solution. In this operation it is preferred to employ ethyl alcohol, although it is also possible to use methanol and isopropyl alcohol. The process will be described with particular reference to ethanol. Generally the ethanol will be denatured with a small quantity of methanol. The alcohol is used to produce a state of continuous supersaturation in the monosodium glutamate solution so as to provide for the progressive crystallization of this material under controlled conditions.

If the pH of the monosodium glutamate solution when diluted tenfold with water (i. e. 4 to 5 per cent monosodium glutamate concentration) does not lie within the range of 5.7 to 6.8, it is adjusted to a value within that range by the proper addition of caustic soda or glutamic acid. Crystallization of monosodium glutamate is satisfactory, and equally so, throughout this pH range. A pH of 5.7 is the lowest pH value that can be produced in a saturated water solution of monosodium glutamate (at 25° C.) by solution therein of glutamic acid, and the pH of a 4 to 5 per cent solution of pure monosodium glutamate in water alone is 6.8. Crystallization at pH values above 7 is undesirable because it is accompanied by formation in the product of a yellow color, an undesirable ammoniacal odor, and considerable hygroscopicity. The degrees of these undesirable qualities increase rapidly with increase of pH above 7, and at pH 8 the product becomes useless as a condiment.

The monosodium glutamate solution having the desired pH value is brought if necessary to a temperature between 20° C. and 50° C. In fact, it is preferred to employ a temperature of between 30° C. and 40° C. Increase of temperature above the range specified may accelerate crystallization but results in the formation of an undesirable yellow color in the solution and this color persists in the crystallized product. Below 20° C. the crystallization is too slow for practical purposes.

The decolorized monosodium glutamate solution is placed in a covered tank equipped with an agitating or stirring device of medium speed and there is admixed with the solution a relatively small quantity of anhydrous ethanol containing about 10 per cent methyl alcohol. After addition of this initial quantity of alcohol there is added to the mixture a quantity of previously formed dry monosodium glutamate crystals. The initially added alcohol is sufficient to prevent the crystals from going into solution. After about 5 minutes stirring alcohol again is added to the monosodium glutamate solution at a controlled uniform rate so as to complete the addition of the alcohol in a minimum time of 12 hours. During this time the alcohol is added at a rate which provides for a controlled and continuous state of supersaturation of the monosodium glutamate. Initially, the monosodium glutamate crystallizes from the solution in the form of small crystals which act as nuclei in the crystallization of subsequent quantities of the material. Thus, the added dry monosodium glutamate first initiates the formation of a limited quantity of nuclei and thereafter the additional monosodium glutamate which is crystallized from the solution builds up on the controlled quantity of nuclei which is formed during the operation of the process.

The minimum time of 12 hours specified with respect to ethanol also applies in connection with the use of methanol and isopropyl alcohol. A feature of the process is that this addition is sufficiently slow as to provide for the formation of large crystals under the conditions of the process. The particular time will depend upon the purity of the monosodium plutamate solution and the total quantity of alcohol employed. By operation in accordance with the present process it is not necessary to use more than 3 volumes of alcohol to 1 volume of the monosodium glutamate solution.

After the alcohol addition has been completed and the crystallization is finished the thin slurry of alcoholic mother liquor and crystalline monosodium glutamate is washed first with 70 to 75 per cent ethanol and then with 95 per cent alcohol. The cake then is dried in air or in an oven and the dry product consists of white, odorless, free-flowing, dustless, essentially unitary crystals, practically all of which lie in the grain size of 100 to 150 mesh. The packing density of the dry crystals is about 50 pounds per cubic foot.

As a specific example of the operation of the process the monosodium glutamate solution prepared as described above was placed in a covered tank equipped with a medium speed stirring device and to it was added 12 gallons of anhydrous ethanol containing about 10 per cent methyl alcohol as a denaturant. After about 5 minutes stirring 6 pounds of 150 to 200 mesh dry monosodium glutamate was added. Thereafter additional quantities of the anhydrous ethanol was added at a uniform rate of approximately 0.2 gallon per minute (12 gallons per hour) for 24 hours. During this time the mixture was stirred continuously and the temperature of the solution was maintained at about 30° C.

After the 24 hour period of crystallization and addition of alcohol the thin alcoholic mother liquor and crystalline monosodium glutamate was filtered. The cake was washed with 50 gallons of 70 to 75 per cent ethanol and then with 25 gallons of 95 per cent ethanol. After drying, the product was found to consist of crystals having a grain size between 100 to 150 mesh and consisted of essentially pure monosodium d-glutamate, as will be indicated from observation of the following data with respect to the product as compared with pure monosodium glutamate.

| | Product | Pure mono- sodium gluta- mate |
|---|---|---|
| Percent total nitrogen (air-dry basis) | 7.50 | 7.48 |
| Specific rotation (10% water soln.) | −3.47 | −3.50 |
| Water solubility at 20° C. (g./100 g. soln.) | 41.8 | 41.7 |
| Density of sat. water soln. at 20° C. (°Bé.) | 26.2 | 26.2 |
| pH of 5% water soln | 6.82 | 6.80 |
| Percent moisture (60 min. in oven at 105° C.) | 0.1 | 0.1 |

Stated generally, the anhydrous ethanol is added during the crystallization step at a rate of about 20 pounds per hour per 100 pounds of monosodium glutamate in the aqueous solution when the specific rotation of the starting crude glutamic acid is plus 30° in hydrochloric acid solution and the crystallization temperature is about 30° C. This rate can be increased to 40 pounds per hour if pure glutamic acid is used as the starting material, must be reduced to about 5 pounds per hour if the specific rotation (in hydrochloric acid solution) of the crude glutamic acid is only plus 29° C. These rates of addition should not be increased by more than 10 to 20 per cent or there will be produced a product which dusts rather badly.

When ethanol is employed as the crystallizing agent the monosodium glutamate crystallizes in the form of stout, stubby prisms. From a methanol-water solution the monosodium glutamate tends to crystallize in the form of rather long, slender prisms. Ethanol is superior to isopropanol since the latter can create only a very low degree of monosodium glutamate supersaturation when added to the water solution of the salt. Consequently, crystallization with isopropyl alcohol is much slower than with ethanol or methanol. Crystals forming from an isopropanol-water solution of mono-sodium glutamate are of the same characteristics as crystals forming from an ethanol-water solution.

The addition of more than about one-fourth volume of anhydrous ethanol to a saturated water solution of monosodium glutamate causes an initial separation of liquid phases, but addition of excess solid monosodium glutamate to water-ethanol mixtures produces no separation of liquid phases. Addition of excess isopropanol to a saturated water solution of monosodium glutamate and of excess solid monosodium glutamate to water-isopropanol mixtures both cause separation of liquid phases. Thus, solid monosodium glutamate will "salt out" isopropanol from its water solution but it will not "salt out" ethanol. Methanol when added in any proportion to a saturated water solution of monosodium glutamate does not cause the separation of liquid phases and the addition of excess solid monosodium glutamate to mixtures of water and methanol with widely varying water contents causes no separation of liquid phases. No water solution of monosodium glutamate may be made sufficiently supersaturated to salt out methanol from water solution, but moderately supersaturated water solutions of monosodium glutamate will salt out ethanol. This characteristic constitutes a safety factor in the use of ethanol and the lack of the characteristic with respect to methanol makes it necessary to use great care in the methanol crystallization of monosodium glutamates to avoid exceeding the critical degree of supersaturation at which the formation of "fines" is produced by uncontrolled separation of new crystal nuclei. With the use of ethanol less care is necessary, since excessive surpassing of the critical degree of supersaturation is automatically prevented.

These various alcohols have the general property of decreasing the solubility of the monosodium glutamate, and when added to the solution at the slow rate as specified herein have the property of controlling the number of new crystalline particles formed, thereby causing the glutamate to crystallize out on previously formed nuclei and to build them up in size by accretion.

The various changes in the procedure described herein for the purpose of explanation which may be made without departing from the scope of the invention are intended to be included in the appended claims.

I claim:

1. The process of forming crystalline sodium glutamate, which comprises reacting a sodium compound in the presence of water with glutamic acid having a purity at least equal to that represented by a glutamic acid solution having a specific rotation of plus 29° circular, adding previously formed monosodium glutamate crystals to the solution, and adding to the solution over a period not less than 12 hours a solubility-inhibiting alcohol of not more than 4 carbons, said alcohol being added at a rate which will maintain a small but definite supersaturation necessary for satisfactory crystallization.

2. The process of forming crystalline sodium glutamate, which comprises reacting a sodium compound in the presence of water with glutamic acid having a purity at least equal to that represented by a glutamic acid solution having a specific rotation of plus 29° circular, adding previously formed sodium glutamate crystals to the solution, and adding to said solution over a period of several hours a quantity of an alcohol from the group consisting of methanol, ethanol, and isopropanol, said alcohol being added at a rate which will maintain a small but definite supersaturation necessary for satisfactory crystallization.

3. The process of forming crystalline sodium glutamate, which comprises reacting a sodium compound with an aqueous suspension of glutamic acid having a purity at least equal to that represented by a glutamic acid solution having a specific rotation of plus 29° circular, adding previously formed sodium glutamate crystals to the solution, and adding ethanol to said solution at a rate which will provide a substantially continuous and controlled state of supersaturation corresponding to that provided by addition of said ethanol at a rate of between 5 and 40 pounds per hour per 100 pounds of monosodium glutamate in said solution when the temperature is about 30° C.

4. The process of forming crystalline monosodium glutamate, which comprises providing a concentrated aqueous solution of monosodium glutamate, adding previously formed monosodium glutamate crystals to the solution, and adding a sufficient quantity of a solubility-inhibiting aliphatic alcohol of not more than 4 carbons to said solution over a period of time at least equal to 12 hours and in an amount and at a rate which will maintain a small but definite supersaturation necessary for satisfactory crystallization of an extent which will result in the crystallization of said monosodium glutamate in the form of relatively large particles of a size generally between 100 and 150 mesh.

5. The process which comprises reacting sodium hydroxide and water with glutamic acid having a purity when dry of at least 90 per cent to produce a concentrated solution of monosodium glutamate, adding previously formed crystals of monosodium glutamate to said solution, and mixing a quantity of a solubility-inhibiting aliphatic alcohol of not more than 4 carbons not in excess of about 3 times the volume of said solution to said solution over a period of at least 12 hours, said alcohol being added at a rate which will maintain a small but definite supersaturation necessary for satisfactory crystallization.

6. The process which comprises neutralizing glutamic acid with sodium hydroxide to provide a concentrated solution of monosodium glutamate, adding previously formed crystals of monosodium glutamate to said solution, and adding to said solution over a period of more than 12 hours an alcohol from the group consisting of methanol, ethanol, and isopropyl alcohol, said alcohol being added at a rate which will maintain a small but definite supersaturation necessary for satisfactory crystallization.

PAUL R. SHILDNECK.